Feb. 4, 1930.  R. F. LONABERGER ET AL  1,746,122
HEAVY FUEL VAPORIZER FOR INTERNAL COMBUSTION ENGINES
Filed March 2, 1926    4 Sheets-Sheet 1

Inventors
Robert F. Lonaberger,
Charles F. Sands,
By Emery, Booth, Janney &Varney
their Attorneys Feb. 4, 1930. R. F. LONABERGER ET AL 1,746,122
HEAVY FUEL VAPORIZER FOR INTERNAL COMBUSTION ENGINES
Filed March 2, 1926 4 Sheets-Sheet 2
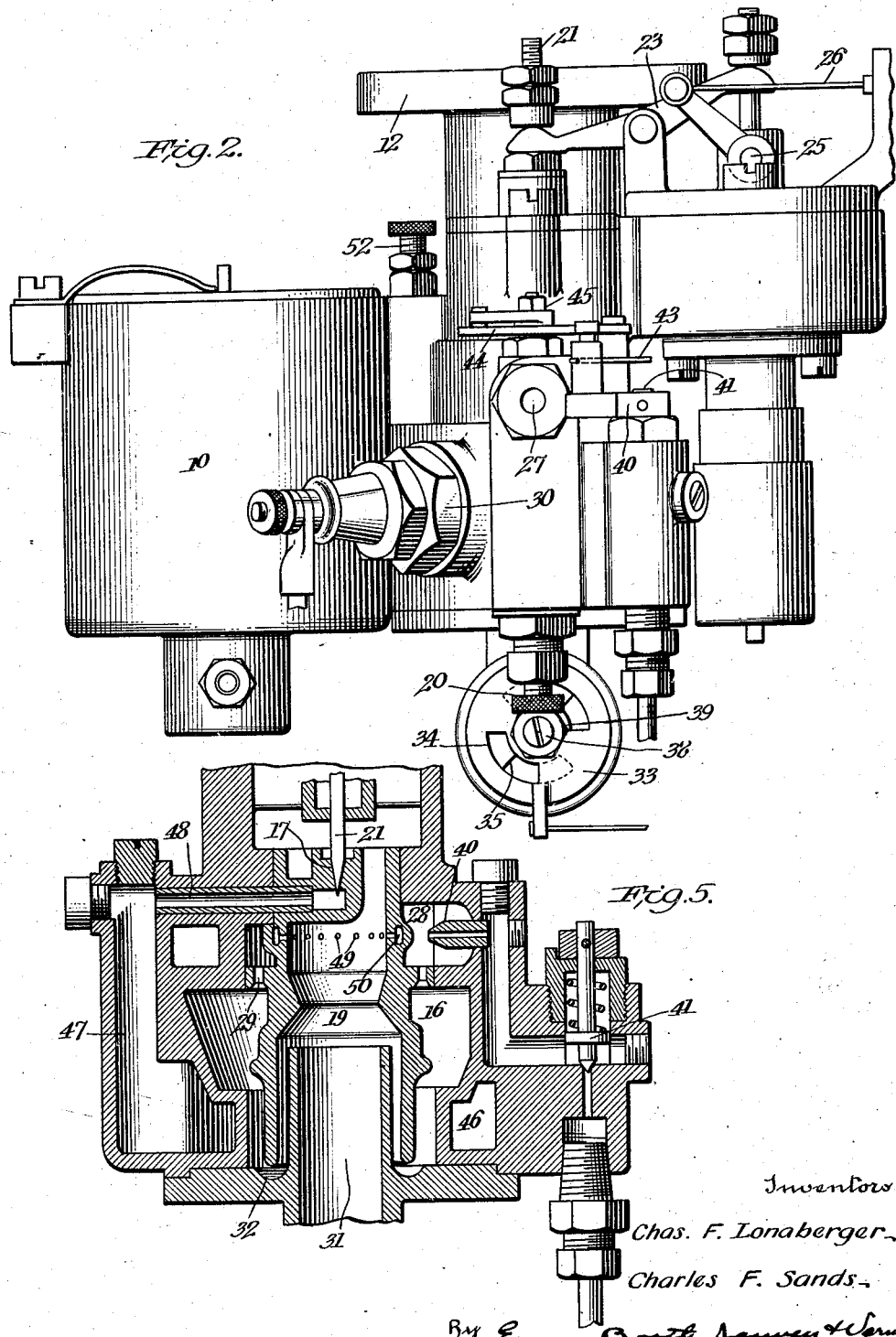
Inventors
Chas. F. Lonaberger,
Charles F. Sands,
By Emery, Booth, Janney & Varney
their Attorneys

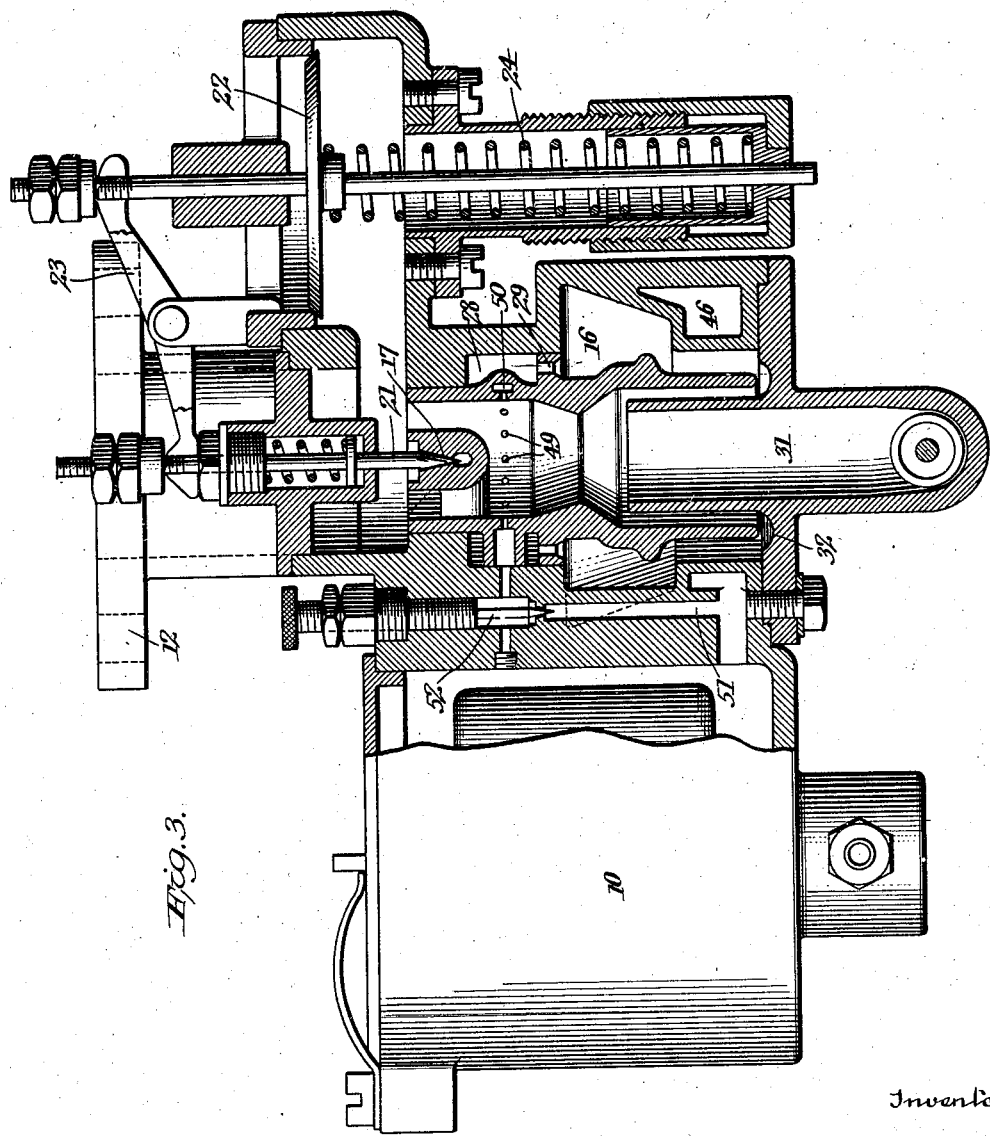

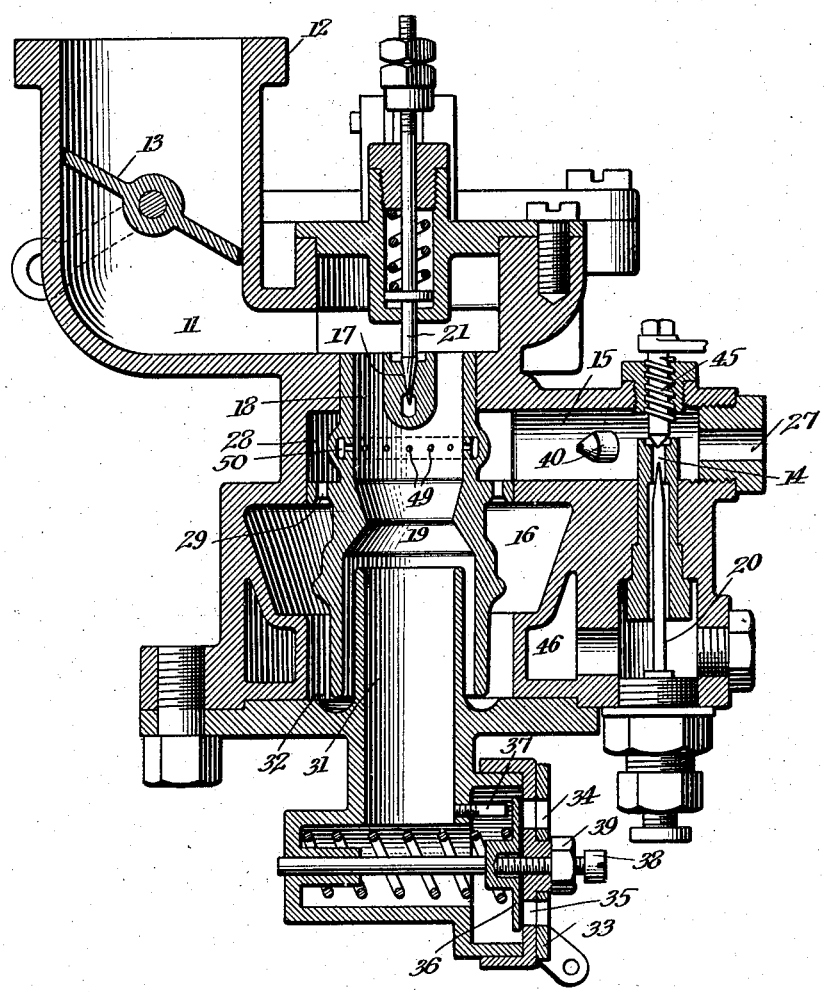

Patented Feb. 4, 1930

1,746,122

UNITED STATES PATENT OFFICE

ROBERT F. LONABERGER AND CHARLES F. SANDS, OF READING, PENNSYLVANIA, ASSIGNORS TO LLOYD A. UNGER, TRUSTEE

HEAVY-FUEL VAPORIZER FOR INTERNAL-COMBUSTION ENGINES

Application filed March 2, 1926. Serial No. 91,789.

This invention aims to provide an improved heavy fuel vaporizer for internal combustion engines.

The invention further aims to adapt such a vaporizer for use in operating internal combustion engines which are primarily designed to run on gasoline and to facilitate starting on a highly volatile fuel.

Further aims and advantages of the invention appear in the following description in connection with the illustrative embodiment shown in the accompanying drawings, wherein:

Fig. 1 is a plan view of a vaporizer intended for internal combustion engines in automobiles, motor trucks and the like;

Fig. 2 is a side elevation of the vaporizer shown in Fig. 1; and

Figure 1:
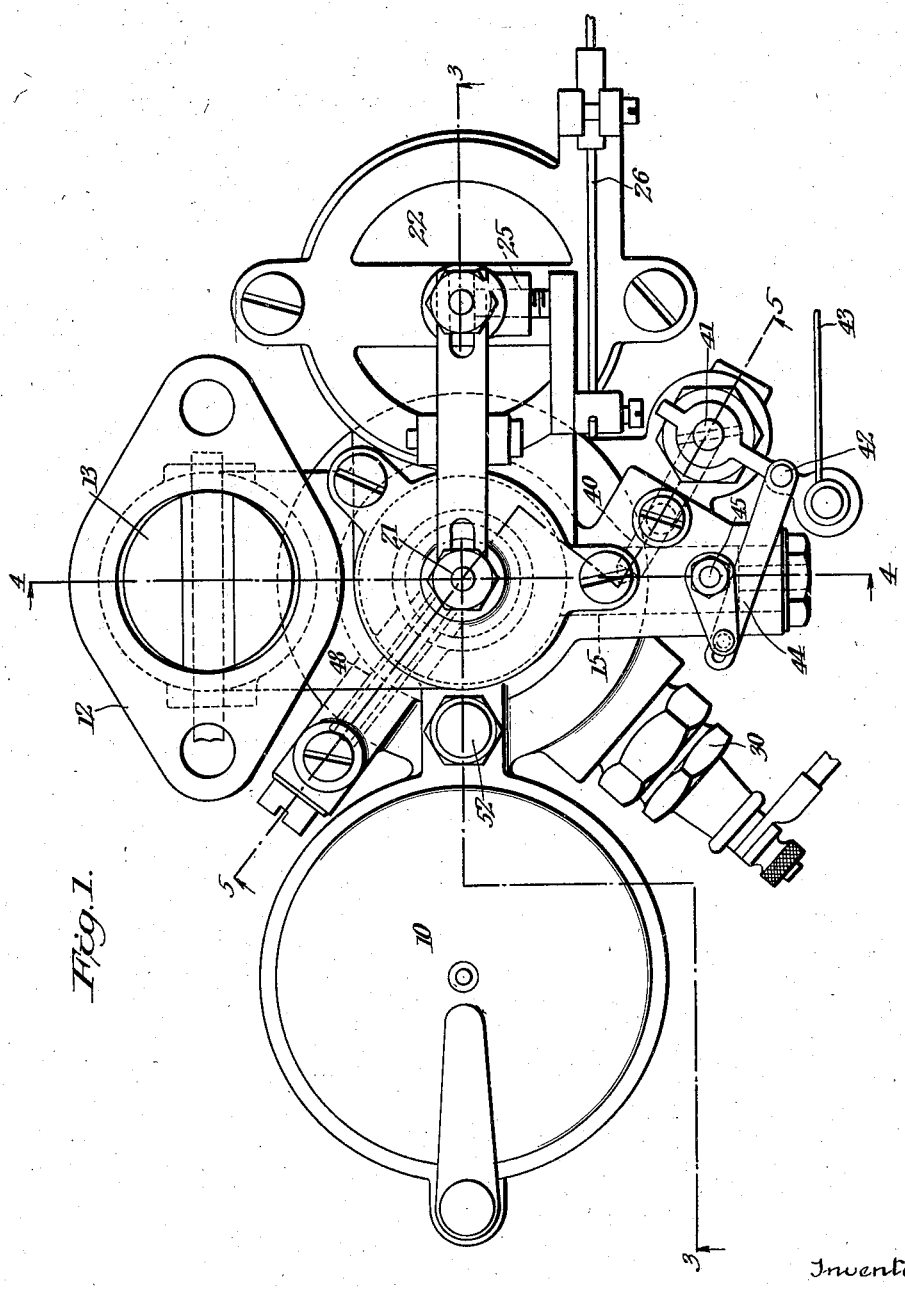

Figs. 3, 4 and 5 are vertical sectional views taken on the lines 3—3, 4—4, and 5—5, respectively of Fig. 1, looking in the direction of the arrows in each case.

In the embodiment of the invention illustrated in the drawings, referring to Figs. 3 and 4, we have shown a vaporizer body 10 having an outlet conduit 11 adapted to be secured to the inlet pipe or manifold of the internal combustion engine by any suitable means, such as the bolting flange 12. A butterfly or throttle valve 13 may be fitted in the outlet conduit 11 for controlling the flow of fuel mixture to the engine.

The vaporizer herein shown (see Fig. 4) has two fuel nozzles for normal operation, one of them being a primary nozzle 14 to supply fuel through a passage 15 to a combustion burner chamber 16, and the other being a high speed nozzle 17, arranged in the throat 18 of a flue 19 which conveys the products of combustion to the conduit 11. This arrangement is such that fuel issuing from the high speed nozzle is preheated and will mix thoroughly with partial products of combustion from the burner before entering the engine cylinders.

The flow of fuel through the primary fuel nozzle may be regulated by a needle valve 20 or other convenient means to suit the fuel and air conditions. The flow of fuel through the high speed nozzle 17 is controlled by the influence of the engine suction. To this end we have shown a spring closed needle valve 21 seated in the nozzle 17 and arranged to be lifted from its seat upon the opening of an auxiliary air valve 22 which supplies air to mix with the high speed fuel (see Fig. 3). This may be accomplished by various mechanical connections but we have herein shown a rocker arm 23 cooperating with the valve stems. The compression of the spring 24 which normally holds the auxiliary air valve 22 seated is preferably adjustable so that the high speed valve may be made to open in response to the desired engine speed or suction resulting from such speed. If desired this auxiliary air valve may be locked temporarily in closed position, say, upon starting the engine, by a cranked clamp or locking screw 25 (see Fig. 1) controlled by a flexible connection 26 from a convenient point. This insures the production of a rich mixture for starting.

An over-rich fuel mixture for the combustion burner is supplied through the passage 15 from the primary nozzle 14 and a restricted air opening 27 (see Fig. 4) entering an annular mixing chamber 28 around the flue 19, thence, passing through a series of openings 29 into the annular combustion chamber 16 which also surrounds the flue 19. There, the mixture is ignited by a spark plug 30 and the flame is extinguished by causing it to travel through a tortuous restricted annular passage provided by an auxiliary air conduit or tube 31 projecting into the lower open end of the flue 19, the outer wall of this tube presenting an annular cup or recess 32 into which the open end of the flue projects.

The products of combustion from the combustion burner pass directly into the vertical flue 19 and are there mixed with auxiliary air drawn in through the air conduit 31 so that the mixture is suited for starting and idling the engine. The admission of auxiliary air is controlled by a valve 33 operable from a convenient point and having perforations 34 adapted to register with similar perforations in a cap 35. Further to control the auxiliary air automatically in response to engine suction we provide a spring urged valve disc 36 partially cutting off the air supply until the suction overcomes the compression of the spring and pulls it against the stop pin 37 to fully open position. The normal opening is preferably adjustable by a set screw 38 on which is a lock nut 39 holding the valve 33 in place. Thus, upon starting the engine the auxiliary air may be partially or wholly cut off by manipulation of the valve.

On account of difficulties encountered in starting a cold engine with heavy fuel we employ a gasolene spray nozzle 40 (see Figs. 1 and 4) arranged to discharge into the passage 15 and supplied by a small tank (not shown). A valve 41 (see Fig. 5) is provided to control this nozzle from a convenient point by a crank arm 42 and flexible wire 43. Connected to the arm 42 is a link 44 connected to operate a cut-off valve 45 for the heavy fuel nozzle, the arrangement being such that the two valves operate simultaneously one to open and the other to close. This enables the operator to use gasolene exclusively for a moment upon starting, then to use a part gasolene and a part heavy fuel by adjusting the valves, and thereafter to use heavy fuel exclusively. The rich gasolene mixture readily ignites in the combustion chamber and burns with a blue flame thereby heating the device to such an extent that it will readily burn heavy fuel, the mixture being preheated in the mixing chamber 28.

To preheat the fuel for the high speed nozzle 17 we provide an annular chamber 46 (see Figs. 4 and 5) below and partially surrounding the combustion chamber so that the fuel readily vaporizes upon being discharged. This fuel passes upwardly through a passage 47 (see Fig. 5) into a small tube or passage 48 through the vaporizer wall. The supply passage to the chamber is connected to the same source of heavy fuel supply as the nozzle 14 (see Fig. 4).

To provide for converting our vaporizer into a gasolene carburetor when heavy fuel is not as easily accessible we have provided an annular series of fuel orifices 49 (see Fig. 3) in the flue 19 each communicating with an annular chamber 50 connected at one side to a passage 51 leading from the float chamber and this is controlled by a valve 52. In an emergency this valve is opened, the high speed air valve is locked in closed position and the main fuel tank may be filled with gasolene.

The operation of our vaporizer is almost entirely automatic except for starting, being controlled by the throttle valve as in gasolene carburetors. For starting, the auxiliary or high speed air valve 22 is locked in closed position while the gasolene valve or cock 41 is opened simultaneously closing the primary fuel nozzle 14 while the auxiliary air valve 33 is closed. When the engine is cranked, the initial suction draws air through the opening 27, picking up gasolene from the nozzle 40 and it is ignited in the fuel chamber by the spark plug 30. After the apparatus is sufficiently heated, the gasolene is entirely cut off, the heavy fuel cut-off valve fully opened, and the auxiliary air valve 33 is also opened. The motor can then run idly or under small load conditions on the partial products of combustion. The high speed air valve is next unlocked so that high speed fuel and air may be admitted in accordance with the demands of the motor. However, if desired, the high speed fuel valve may be so adjusted that it will remain partly open at all times, thereby permitting a little preheated fresh fuel to mix with the partial products of combustion while the engine is idling.

As the speed of the engine increases, the auxiliary air valve 22 will open correspondingly wider thereby opening the high speed fuel nozzle 17 and the preheated fuel will be sucked in to maintain the mixture in proper proportion, thus counteracting the tendency of the auxiliary air to make it too lean with the throttle wide open.

From the foregoing description and the accompanying drawings it will be seen that our design of vaporizer is quite compact since the high speed nozzle, combustion burner, outlet flue preheater and auxiliary air conduit are all coaxially arranged so that it may be substituted for ordinary carburetors. Moreover, this arrangement not only enables the device to preheat the fuel for the combustion burner, but also insures conservation of the heat produced while the vapor is passing to the intake manifold because it has a relatively small radiating surface. Further, it produces a heavy fuel mixture that will run an engine more economically than gasoline without producing an objectionable amount of smoke and without preignition or knocking.

Obviously our invention is susceptible of various changes.

What we claim and desire to secure by Letters Patent is:

1. A heavy fuel vaporizer for internal combustion engines comprising, in combination, a combustion burner chamber having a substantially vertical outlet flue connected to the intake passage of the engine, alternative means for supplying a rich combustible fuel mixture to the burner chamber including two nozzles each connected to a separate liquid fuel supply and feeding into an annular preheating chamber surrounding the flue above the burner chamber and having a plurality of discharge orifices to discharge the mixture into the burner chamber, means to extinguish the flame in said burner before it enters the outlet flue and means to supply auxiliary air to mix with the products of combustion in the intake passage.

2. A heavy fuel vaporizer for internal combustion engines comprising, in combination, a combustion burner having an outlet flue connected to discharge products of combustion into the intake passage of the engine, means for supplying an over-rich combustible fluid mixture to the burner including a fuel mixing chamber arranged to absorb heat from the products of combustion, means to extinguish the flame in the combustion chamber before it enters the outlet flue, a supplemental air conduit discharging in said flue, and high speed fuel and air valves in said passage automatically operative in response to engine suction.

3. A heavy fuel vaporizer for internal combustion engines comprising, in combination, a combustion burner having an outlet flue arranged to discharge products of combustion into the intake passage of the engine, manually controlled means to supply a rich mixture of highly volatile fuel and air to initiate combustion in said burner, means to substitute heavy fuel for the highly volatile fuel after the device becomes heated, a single manipulating device for effecting the substitution, a fuel preheater chamber and fuel supply nozzle associated with the outlet flue, means to extinguish the flame in the burner chamber before it reaches the flue and means to supply air to said flue for mixing with the products of combustion before they reach said nozzle.

4. A vaporizer of the two fuel type having a combustion burner, gasoline and heavy fuel nozzles connected to suitable sources of supply, the respective connections being fitted with individual valves for controlling the fuels, means for operating the valves, a fuel preheating chamber associated with the burner, a valved air supply conduit into which the outlet flue from the burner discharges, inter-connected high speed fuel and air valves, and a passage from the preheating chamber to the high speed fuel valve, said chamber, outlet flue and air supply conduit being arranged in concentric relationship with reference to said burner, substantially as described.

In testimony whereof, we have signed our names to this specification.

ROBERT F. LONABERGER.
CHARLES F. SANDS.